Aug. 24, 1965     J. A. POJE     3,202,542
RELEASE COATING CONTAINING A POLYORGANOSILOXANE RESIN
AND EITHER A POLYORGANOSILOXANE GUM OR A HIGH
VISCOSITY POLYORGANOSILOXANE OIL
Filed June 6, 1961
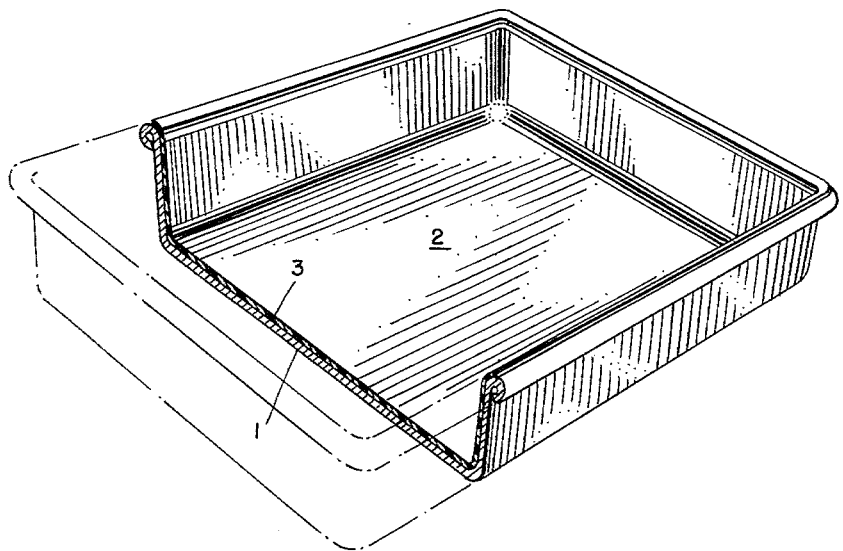
INVENTOR:
JOHN A. POJE
BY
Marzall, Johnston, Cook & Root
ATT'Y United States Patent Office 3,202,542
Patented Aug. 24, 1965

3,202,542
RELEASE COATING CONTAINING A POLYORGANOSILOXANE RESIN AND EITHER A POLYORGANOSILOXANE GUM OR A HIGH VISCOSITY POLYORGANOSILOXANE OIL
John A. Poje, Grand Rapids, Mich., assignor to Peninsular Silicones, Inc., Grand Rapids, Mich., a corporation of Michigan
Filed June 6, 1961, Ser. No. 121,290
8 Claims. (Cl. 117—161)

The present application is a continuation-in-part of copending applications Serial No. 674,530 filed on July 26, 1957, and now abandoned and Serial No. 674,531 filed on July 26, 1957, and now abandoned.

The present invention relates to new and advantageous silicone compositions and, in particular, to silicone compositions containing a polyorganosiloxane resin and either a polyorganosiloxane gum or a high viscosity polyorganosiloxane oil.

The invention is especially concerned with the discovery that a composition of a silicone resin and either a very high viscosity silicone oil or a silicone gum has remarkable release properties. In particular, so far as is known, the invention for the first time provides a permanent or semipermanent silicone release composition which will release charred sugar or sweets over an extended number of uses. The new composition has also been found to produce superior release of other foodstuffs, superior mold release, superior ice release, and a number of other release advantages. The coating composition provides long protection against corrosion and staining. It has also been found that provision of a coat of new composition eliminates the undersirable break-in period of cast iron utensils. These and numerous other applications and advantages of the invention will appear throughout the specification.

The attached drawing represents one preferred embodiment of the invention. It is a sectional view of a metal baking or cooking pan 1, which may be employed for baking a sugar-containing foodstuff subject to sugar charring. To release the baked product and especially charred material at the inner surfaces 2 of the pan, a thin film or coat 3 of a hardened intimate mixture of a polyorganosiloxane resin and either a polyorganosiloxane oil or polyorganosiloxane gum is provided on the inner surfaces of the pan 1.

Silicone resins, gums, and oils or fluids are well-known, as are many of their desirable properties, which make them useful in various applications. By reference to silicones or polyorganosiloxanes is meant polymers having alternate silicon and oxygen atoms in the skeletal structure, and containing silicon-bonded hydrocarbon radicals, the hydrocarbon radicals being attached to the silicon through carbon-silicon linkages. Such hydrocarbon radicals may comprise, for instance, alkyl radicals (e.g., methyl, ethyl, and propyl); aryl radicals (e.g., phenyl, naphthyl); alkaryl radicals (e.g., tolyl, xylyl); aralkyl radicals (e.g., benzyl, phenyl-ethyl); cycloalkyl radicals such as cyclohexyl; and heterocyclic radicals. The hydrocarbon radical may be substituted with essentially inert substituents as, for example, halogens. As will be more fully pointed out below, it is preferred that a majority of the hydrocarbon radicals be methyl radicals. The silicone resins are 3-dimensional cross-linked relatively rigid solid polymers when hardened or thermoset. The silicone gums have substantially two hydrocarbon radicals per silicon atom and are apparently linear or may be somewhat cross-linked to form 2 or 3-dimensional polymers.

The present invention provides a new and highly useful composition of matter, of a polyorganosiloxane resin and either a polyorganosiloxane gum or high viscosity polyorganosiloxane oil. A new coating composition of the polyorganosiloxanes dispersed in an organic solvent is provided. The invention also provides supported films of the polyorganosiloxanes, articles of manufacture having a surface coat thereof, a method of treating a surface, a method for heating a foodstuff, and other useful articles and methods.

Silicone resins of the type described above are initially provided in the form of their soluble heat-hardenable or thermosetting partially condensed or polymerized forms, as obtained by hydrolysis of a suitable organosilane or mixture of silanes followed by partial condensation. The processes for producing such resins are well described in the art and numerous such compositions are available on the market. The silicone resins contain as the polymer units, $SiO_2$, $RSiO_{1.5}$, $R_2SiO$, and $R_3SiO_{0.5}$. The linear silicone gums are substantially composed of $R_2SiO$ polymer units. R represents a monovalent hydrocarbon radical as described above. The hydrocarbon radicals are preferably alkyl radicals containing less than four carbon atoms and phenyls, for example, methyl, ethyl, phenyl, and tolyl. At least 50% of the hydrocarbon radicals should be methyl radicals. A resin containing 100% methyl radicals would have the best release properties. Such a resin is brittle, however, and, therefore, it is difficult to obtain commercially. Aromatic radicals such as a phenyl radical are added to the resin in order to provide a softer product. Preferably, at least 80% of the hydrocarbon radicals should be either methyl, ethyl or phenyl radicals, and the molar ratio of methyl radicals to aromatic radicals, such as phenyl radicals, should be greater than about 2:1. Phenyl radicals are preferred over other aromatic radicals because of their stability. The resins employed in the present invention contain between 0.95 and 1.9 hydrocarbon radicals per silicon atom, preferably, from 1.3 to 1.7 such radicals.

The preparation of silicone gums (also referred to as silastics or elastomers) is well-known and they are readily available. They are substantially di-substituted polyorganosiloxanes having a molecular weight of at least about 400,000 and preferably about 1,000,000 to 1,500,000 or more. The upper limit of the viscosity is not critical although the gum should be soluble in an organic solvent. A representative method of producing the gums is described in U.S. Patent 2,448,756 to Agens. The gums are preferably washed prior to dissolution in an organic solvent as described in U.S. Patent 2,430,032 to Scott. At least 50% of the hydrocarbon radicals should be methyl radicals. Preferably, at least 80% of the radicals should be methyl, ethyl, or phenyl radicals, and the molar ratio of methyl radicals to phenyl radicals should be at least 2:1.

A linear dimethyl polysiloxane gum may also be prepared by the hydrolysis and condensation of dimethyldichlorosilane or a dimethyldialkoxysilane. Hydrolysis is usually conducted by a water-solvent technique, wherein the solvent can be either an alkanol or an ether. The hydrolyzate is usually treated with an alkaline catalyst to equilibrate the product into a high molecular weight gum. The molecular weight may vary as described above.

The silicone oils may contain the polymer units described above for the resins, and are for the most part composed of $R_2SiO$ or $RHSiO$ radicals. The oils contemplated in the invention contain from 1.8, preferably about 2, to 2.1 total hydrocarbon and hydrogen radicals per silicon atom. It is further preferred to employ silicone oils composed of $R_2SiO$ units, other than the terminal radicals which may be $R_3SiO_{0.5}$ units. The preferred hydrocarbon radicals are, as for the resins, alkyl radicals containing less than four carbon atoms and phenyls, such as methyl, ethyl, phenyl and tolyl. At least 50% of the hydrocarbon radicals should be methyl radicals. In order to provide a stable product, preferably at least 80% of the radicals should be methyl, ethyl or phenyl radicals with the molar ratio of methyl radicals to phenyl radicals being at least 2:1. A discussion of the comparison between silicone gums, oils and resins is set forth in "An Introduction to the Chemistry of the Silicones" by Eugene G. Rochow, 2d edition, 1951, at page 82.

In order to produce semipermanent release of, especially, charred sweet products, it has been found to be necessary to employ a silicone oil having a vsicosity of at least about 200,000 centistokes (at 25° C.), up to more than 1,000,000. Preferably, the oil should have a viscosity of from about 600,000 to 1,200,000 centistokes. The upper viscosity limit of the oil is not critical but the oil should be soluble in an organic solvent.

As was pointed out above, in manufacturing silicone coats or films which are employed at relatively high temperature, it is preferred to employ the more stable methyl and phenyl-substituted silicones. The silicone resin is preferably a polymer of both methyl and phenyl radicals, and the gum or oil is preferably a dimethyl silicone. It is further preferred that the average resin composition, including a mixture of resins, contain a greater molar proportion of methyl radicals than phenyl radicals, preferably greater than about 2 to 1.

The new silicone composition is composed of a major weight proportion of a silicone resin and a minor weight proportion of a silicone gum or high viscosity oil. The composition contains about 0.05 to 2 parts by weight of the silicone gum or oil to 15 parts by weight of the silicone resin. Such a composition contains an effective proportion of the gum or oil and yet there is no reticulation or bead formation when applied as a thin coat on an article. It is further preferred to employ about 0.3 to 1 part of the gum or oil per 15 parts of the resin, inasmuch as use of a greater proportion of the gum or oil does not appear to furnish any substantial additional improvement. The composition employed most widely contains about 0.5 to 15 parts, gum or oil to resin, although the proportion of gum or oil might be increased up to 1 part.

The new composition is applied in the form of a very thin, hardened film on a suitable support or article. It is apparently necessary that the thickness of the film be no greater than about 0.5 mil to produce a uniform continuous coat or film. When the coat is unduly thick, bead or bubble formation or the like occurs, destroying the integrity of the film. The preferred minimum film thickness is about 0.1 mil, although a lesser thickness may be useful in certain applications.

As described above, an outstanding result provided by the invention is the repeated release of charred sugar or sweets over a considerable number of uses of the composition in contact with material which chars. The release of charred sweets had previously been an important problem. Coating merely with silicone resins did not release such material. It was quite surprising to discover that the incorporation of but a minor proportion of a silicone gum or oil solved the problem while yet providing an excellent coating composition which withstood repeated uses of the coated article under high temperature conditions in contact with foodstuffs. It was further found that the new composition was markedly superior to the use of a silicone resin alone in a number of applications. For example, the new composition is now recommended for mold release of epoxy resins and for rubber instead of the prior compositions containing only silicone resins. The composition also provides excellent release of a variety of other foodstuffs, especially baked products, as well as other types of foods prepared in other ways, such as bacon, eggs, pancakes and many others. In baking bread and muffins, for example, it is not necessary to grease the pans, but the baked products are merely dropped out and the pans washed under the tap.

The new coating compositions are composed of a soluble thermosetting silicone resin and a soluble silicone gum or oil homogeneously dispersed in a liquid organic solvent for the silicones. The solvents for the silicones are well known, and a solvent is selected which is sufficiently volatile to vaporize during the hardening process. Preferred solvents include toluene, xylene, benzene, and hydrocarbon solvents having a Kauri-Butanol rating greater than 50, especially chlorinated aliphatic hydrocarbons. The silicone composition is preferably employed in solution in toluene.

In dissolving or dispersing the silicones in the solvent, it is desired to provide as concentrated a composition as possible, to reduce the amount of solvent required and to be evaporated. It is also necessary that the viscosity be sufficiently low to enable the provision of a uniform very thin film as previously described, and sufficiently high to cover a surface completely. The preferred manner of application to an article is to spray a solution of low viscosity over the work, employing sufficient passes to build up the film to the requisite thickness. For such application, the concentration of silicones in toluene is preferably less than about 20%, and about 15% has been found to be very satisfactory.

The optimum concentration of the silicones in the solvent will vary with their solubilities and the resulting viscosities. Consideration must also be given to the mutual compatibilities of the resin and the gum or oil in the solvent, as it has been found that increasing concentration of the resin results in decreasing solubility of the gum or oil, so that an excess of the gum or oil above its solubility will precipitate. Thus, the proportions of the silicones and the concentrations in the solvent are preferably selected so that a homogeneous dispersion of the silicones in the solvent is produced. By reference to a homogeneous dispersion is meant either a true complete solution or a very fine substantially stable dispersion such as a colloidal dispersion.

The coating composition is compounded in a simple manner, essentially by mixing the ingredients. Inasmuch as the rate of solution of the gum or oil is slow, it is preferred to dissolve this component in the solvent and then to add the silicone resin. The rate of solution of the gum or oil in the solvent can be increased by heating. The resin, of course, should not be heated until after it has been applied to the cooking utensil or the like.

To accelerate hardening or curing, a curing catalyst, especially for the resin, may also be incorporated in the composition. Such catalysts are known. In the invention, it is preferred to incorporate an effective amount, ordinarily a fractional percent by weight of the remainder of the composition, of diethanolamine. This ingredient may be added at the option of the user. It is preferred not to add the catalyst when the composition is likely to stand for a period of time, to preclude excessive polymerization or setting prior to use.

The coating composition is applied preferably by spraying, and conventional spray equipment for paint, lacquer, etc., may be utilized. A thin layer is applied to the surfaces of an article which it is desired to treat, for release and/or corrosion protection or other protective purposes. After allowing to dry in the open air at room temperature for a short period of time, about 15 to 30 minutes, or employing heated air or drying equipment, the silicone layer is heat-hardened, thermoset or cured by heating at an elevated temperature. Where no catalyst is employed, heating about one hour at 200° C.–300° C. is recommended, preferably at 250° C. The hardening time may be greater or less, depending upon the temperature employed. Where a catalyst is employed in the composition, especially when the article is not desirably heated so high, the temperature may range from about 90° C. to about 200° C., with the time decreasing with increasing temperature and with increasing catalyst concentration.

In this manner, many different articles constructed of various materials may be provided with an effective coat of a hardened, intimate, homogeneous mixture of silicone resin and silicone gum. Outstanding results are obtained by coating cooking implements, including such articles as cake pans, cookie sheets, pie pans, sauce pans, fry pans, griddles or grills, waffle makers, roasters, poachers, pots, utility pans, glass and enamelware, bowls, mixer equipment, auxiliary equipment such as knives, forks and spatulas, oven interiors and other vessels and apparatus, constructed of metals, enamel and glass, such as aluminum and its alloys, tin plated articles, cast iron, and steel. Ice cube trays and other articles subjected to icing conditions are advantageously coated. Release and/or corrosion protection may be provided for various other vessels, conveyor equipment, trays, conduits and fittings used for transporting, processing and storing foods and other materials.

The new coating composition properly applied results in a hard, durable, tightly adherent yet flexible transparent silicone film. Before applying the composition, it is necessary to insure that the surface of the article is completely clean. At times, a simple wash with soap and water will be sufficient. Some articles will require a degreasing operation. If the surface of the article is corroded, mechanical or chemical preparation of the surface, such as pickling, may be necessary.

The following examples are illustrative of the invention and of a number of representative applications thereof. It will be understood that the invention is not limited to the components, proportions, conditions, and procedures, nor to the applications given therein. Unless otherwise specified, the parts are by weight.

Example 1

The following is a preferred coating composition in parts by weight.

|  | Parts |
|---|---|
| Silicone gum | 0.5 |
| Silicone resin A (60% solids in toluene) | 24.0 |
| Silicone resin B (50% solids in toluene) | 1.2 |
| Toluene | 74.3 |

A preferred silicone gum is a clear, high molecular weight, high viscosity, dimethyl silicone polymer identified as Dow Corning 400 gum. Resin A is a partially condensed methylphenyl polysiloxane resin, prepared by controlled hydrolysis and condensation of organosilanes as described in U.S. Patents Nos. 2,646,441 and 2,744,923. The silane starting materials and the proportions are as follows:

|  | Mol, percent |
|---|---|
| Dimethyldichlorosilane | 30 |
| Phenyltrichlorosilane | 40 |
| Methyltrichlorosilane | 30 |

The resin starting material is a partially condensed and cross-linked resin containing residual hydroxyl groups in an amount of about from 1 to 4% by weight of the polymer. The resin is provided in a 60% solids solution in toluene having a viscosity which can range from about 75 up to about 1,000 centistokes. Upon curing the resin, a hard polyorganosiloxane is obtained through condensation of the residual hydroxyl groups. The resin is a polymer containing the following units: $(Me_2SiO)$, $(PhSiO_{1.5})$, and $(MeSiO_{1.5})$, in the above proportions, wherein Me represents methyl and Ph represents phenyl.

Resin B is a partially condensed methyl-phenyl polysiloxane resin prepared by controlled hydrolysis and condensation. The silane starting materials and their proportions are:

|  | Mol, percent |
|---|---|
| Methyltrichlorosilane | 13 |
| Phenyltrichlorosilane | 35 |
| Dimethyldichlorosilane | 47 |
| Diphenyldichlorosilane | 5 |

This resin is prepared by hydrolyzing a mixture of the above starting materials with a mixture of water and ether. The reaction is exothermic, and the mixture is stirred while hydrogen chloride evolves. After the evolution of hydrogen chloride, the resulting mixture of hydrolyzate is heated to remove the ether solvent, and the product is then dissolved in toluene and refluxed to remove the last traces of free water therein. A small amount of a sodium hydroxide or other alkaline catalyst is added to the product and the mixture heated. The viscosity of the resin increases up to a desired point, at which time the catalyst is killed. The resin contains about 0.5 to about 3% by weight of residual hydroxyl groups. It is provided in a 50% solids solution in toluene having a viscosity ranging from about 75 up to about 1,000 centistokes. The composition also contains a cobalt octoate in an amount of less than 0.4% cobalt based on the weight of the resin. Upon curing a polyorganosiloxane resin is obtained containing the following polymer units: $(MeSiO_{1.5})$, $(PhSiO_{1.5})$, $(Me_2SiO)$, and $(Ph_2SiO)$, in the above proportions.

The resins may vary in their composition. It is preferred to maintain the hydrocarbon radical to silicon ratio at from about 1.3 to 1.7 radicals per silicon atom.

The above coating composition contains an average of about 15.5% silicone solids, including both the gum and the resins, and it varies plus or minus 1%, due to variations in the makeup of the resin toluene solutions. Thus, the resins may constitute from 14 to 16% by weight of the complete solution. When the proportion of gum is increased up to 1 part, or 1% by weight, the results are likewise excellent. There is, however, apparently no substantial advantage in increasing the proportion of the gum, so that it is generally preferred to employ about 0.5 part.

In compounding the composition, a preferred method is to add the silicone gum to about one-half of the added toluene, and then agitate for 12 to 24 hours at room temperature. The resin solutions are then added, and agitation is continued for about 10 to 15 minutes or greater. The balance of the toluene is then added, followed by further agitation for 15–30 minutes. The silicone gum and resin ingredients are completely dispersed, in either a true solution or a fine dispersion of apparently colloidal articles.

Example 2

In testing the sweet release properties of silicone compositions, 24 ST–3 and 3s aluminum alloy half hard aluminum panels were coated with silicone solutions by spraying. The coated panels were air-dried for fifteen minutes and cured in an oven by heating at 250° C. for about one hour. Sweet release was determined by applying commercial molasses to the panels, and heating at 250° C. for about 15 minutes until complete charring had taken place, after which the panels were allowed to cool to room temperature.

The panels coated with the composition of Example 1 were found to give excellent release of the charred molasses. When the charred material was touched with the finger, the whole mass slid off of the panel without breaking. In this test, for comparative purposes, the same excellent results were obtained for seven repetitions of the test. In use of utensils provided with the same coating, it is found that the film is very long-lasting, furnishing excellent results through a large number of repeated uses.

When the test was repeated with commercial compositions of silicone resins designed for foodstuff release, there was no release of the charred mass from the panels.

A test with the silicone gum alone, 1% in toluene, produced two successive good releases and two further poorer releases, which exhausted the release capacity of the gum film.

Example 3

To coat molds or dies for release purposes, the surfaces are first cleaned as previously described. The composition of Example 1 may be applied by a standard spray equipment such as a DeVilbiss Spray Gun Type EGA, series 501. Spraying may be conducted at an air pressure of 35–40 pounds per square inch, at a distance of 1½ to 2 feet between the gun and the work surface, and at a spray angle of about 45° to 55°. A film of about 0.0001 to 0.0003 inch, or 0.1 to 0.3 mil, may be built up by employing about 6 to 10 passes over the work. The surfaces are allowed to dry in the open air for about 15 to 30 minutes.

When the mold material can tolerate the temperature, heat-hardening or curing is produced by heating in an oven, preferably with forced circulation, at a temperature of about 250° C. for about 1 hour. Where the mold materials are susceptible to heat, from 0.045% to 0.15% by weight of the complete solution of Example 1, of diethanolamine is added to the composition. This curing catalyst is added at the time of application, so as not to decrease the shelf life of the composition. Representative curing schedules are as follows.

0.045% catalyst:
　1 hr. at 400° F.
　4 hrs. at 300° F.
　10 hrs. at 250° F.
　24 hrs. at 200° F.
0.15% catalyst:
　½ hr. at 400° F.
　1 hr. at 300° F.
　2 hrs. at 250° F.
　6 hrs. at 200° F.

The foregoing application and hardening or curing conditions are likewise applicable to the various other surfaces to which the new composition may be applied to produce a hard, durable, tightly adherent, flexible and transparent continuous uniform silicone coat.

Example 4

Employing the composition of Example 1 and the manner of application and hardening conditions of Example 3, aluminum low alloy panels were coated with films 0.1 to 0.2 mil thick. No visible signs of film failure were observed after 8200 hours of standard salt spray testing.

Example 5

Baking pans were coated with the composition of Example 1 in the manner of Example 3. Bread was baked repeatedly in the pans, with no use of grease, and excellent release was provided over many repetitions. It was simply necessary to knock the pans to release the bread, and then rinse under the tap.

Sweet rolls were baked repeatedly in such pans, and the charred sugar material was released excellently.

Example 6

Bacon was fried on skillet provided with the coating composition of Example 1. After frying, it was merely necessary to rinse the skillet under the tap, without necessity for washing with soap or the like.

Example 7

Tin plated ice cube trays for an automatic ice cube-making machine were provided with the coating composition of Example 1. After over 2100 cycles of filling, freezing, and releasing, the silicone film exhibited no visible signs of failure or diminishment. The composition was found to be far superior to the commonly used carnauba waxes for treatment of ice cube trays.

Example 8

When the composition of Example 1 was applied to kitchen range surface grills, breakfast-type foods were prepared at least once daily over a period of three months, during which time excellent release of foodstuffs was observed.

Example 9

Extensive laboratory testing with cast aluminum houseware coated with the composition of Example 1 demonstrated that on the majority of foods normally prepared in the kitchen, the new composition offered much greater ease of cleaning, prevention of corrosion, pitting and staining of the utensils and lids, and enabled the preparation of foods without lubricants. The composition was tested against several others distributed for the same purpose and found to be superior.

Example 10

The composition of Example 1 was subject to tests for semipermanent mold release for epoxy resins and rubber products. The composition was found to be superior to coats of the same resins employed alone, not in conjunction with the silicone gum. A smooth, transparent surface is provided in forming the epoxy resins, whereas this property is not obtained with other available mold releases.

Example 11

Cast iron utensils were provided with the coating composition of Example 1, applied and hardened as described in Example 3. It was found that the manufacturer was able to eliminate the usual polishing and finishing procedure. The composition was applied after degreasing, directly from the tumbling machines. It was found that the undesirable break-in period of the cast iron utensils was completely eliminated. As the utensils were used, the natural seasoning of the cast iron took place as the silicone film eventually diminished, so that the utensils continued to functions as completely broken-in articles.

Example 12

The coating composition of Example 1 applied to the processing vessels produced very favorable release of chewing gum. Likewise, the composition applied to vessels employed in the manufacture of candies and other sweet products provided very favorable release properties.

Example 13

The composition of Example 1 was applied to commercial equipment employed in the preparation of hamburger and hotdog buns. The composition provided results which were far superior to other products available for the same indicated use.

Example 14

The following is a preferred oil containing coating composition, in parts by weight.

| | Parts |
|---|---|
| Silicone oil, 1,000,000 centistokes at 25° C. | 0.5 |
| Silicone resin A (60% solids in toluene) | 24.0 |
| Silicone resin B (50% solids in toluene) | 1.2 |
| Toluene | 74.3 |

A preferred silicone oil is a high molecular weight dimethyl silicone polymer identified as Dow Corning 200 Fluid. It may be represented by the formula:

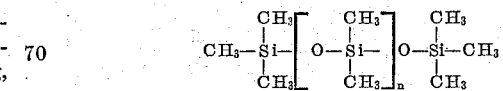

Resin A is a partially condensed methyl-phenyl polysiloxane resin, prepared by controlled hydrolysis and condensation of organosilanes as described in U.S. Patents Nos. 2,646,441 and 2,744,923. The silane starting materials and their proportions are as follows:

| | Mol, percent |
|---|---|
| Dimethyldichlorosilane | 30 |
| Phenyltrichlorosilane | 40 |
| Methyltrichlorosilane | 30 |

The resin starting material is a partially condensed and cross-linked resin containing residual hydroxyl groups in an amount of about from 1 to 4% by weight of the polymer. The resin is provided in a 60% solids solution in toluene having a viscosity which can range from about 75 up to about 1,000 centistokes. Upon curing the resin, a hard polyorganosiloxane is obtained through condensation of the residual hydroxyl groups. The resin is a polymer containing the following units: $(Me_2SiO)$, $(PhSiO_{1.5})$, $(MeSiO_{1.5})$, in the above proportions, wherein Me represents methyl and Ph represents phenyl.

Resin B is a partially condensed methyl-phenyl polysiloxane resin prepared by controlled hydrolysis and condensation. The silane starting materials and their proportions are:

| | Mol, percent |
|---|---|
| Methyltrichlorosilane | 13 |
| Phenyltrichlorosilane | 35 |
| Dimethyldichlorosilane | 47 |
| Diphenyldichlorosilane | 5 |

This resin is prepared by hydrolyzing a mixture of the above starting materials with a mixture of water and ether. The reaction is exothermic, and the mixture is stirred while hydrogen chloride evolves. After the evolution of hydrogen chloride, the resulting mixture or hydrolyzate is heated to remove the ether solvent, and the product is then dissolved in toluene and refluxed to remove the last traces of free water therein. A small amount of a sodium hydroxide or other alkaline catalyst is added to the product and the mixture heated. The viscosity of the resin increases up to a desired point, at which time the catalyst is killed. The resin contains about 0.5 to about 3% by weight of residual hydroxyl groups. It is provided in a 50% solids solution in toluene having a viscosity ranging from about 75 up to about 1,000 centistokes. The composition also contains a cobalt octoate in an amount of less than 0.4% cobalt based on the weight of the resin. Upon curing, a polyorganosiloxane resin is obtained containing the following polymer units: $(MeSiO_{1.5})$, $(PhSiO_{1.5})$, $(Me_2SiO)$, and $(Ph_2SiO)$, in the above proportions.

The above coating composition contains an average of about 15.5% silicone solids, including both the oil and the resins, and it varies plus or minus 1%, due to variations in the makeup of the resin toluene solutions. Thus, the resins may constitute from 14 to 16% by weight of the complete solution. When the proportion of oil is increased up to 1 part, or 1% by weight, the results are likewise excellent. There is, however, apparently no substantial advantage in increasing the proportion of the oil, so that it is generally preferred to employ about 0.5 part.

In compounding the composition, a preferred method is to add the silicone oil to about one-half of the added toluene, and then agitate for 30–60 minutes at room temperature. The resin solutions are then added, and agitation is continued for about 10 to 15 minutes or greater. The balance of the toluene is then added, followed by further agitation for 15–30 minutes. The silicone oil and resin ingredients are completely dispersed, in apparently a true solution.

Example 15

In testing the sweet release properties of silicone compositions, 24 ST–3 and 3s aluminum alloy half hard aluminum panels were coated with silicone solutions by spraying. The coated panels were air-dried for fifteen minutes and cured in an oven by heating at 250° C. for about one hour. Sweet release was determined by applying commercial molasses to the panels, and heating at 250° C. for about 15 minutes until complete charring had taken place, after which the panels were allowed to cool to room temperature.

The panels coated with the composition of Example 1 were found to give excellent release of the charred molasses. When the charred material was touched with the finger, the whole mass slid off of the panel without breaking. In this test, for comparative purposes, the same excellent results were obtained for seven repetitions of the test. In use of utensils provided with the same coating, it is found that the film is very long-lasting, furnishing excellent results through a large number of repeated uses.

When the test was repeated with commercial compositions of silicone resins designed for foodstuff release, there was no release of the charred mass from the panels. A test with silicone oil alone produced only several releases, which exhausted the release capacity of the oil film. When 60,000 centistokes Dow Corning 200 fluid was substituted for the 1 million viscosity fluid in the composition of Example 14, the release capacity of the film was exhausted after five successive releases.

Example 16

To coat molds or dies for release purposes, the surfaces are first cleaned as previously described. The composition of Example 14 may be applied by a standard spray equipment such as a DeVilbiss spray gun, type EGA, series 501. Spraying may be conducted at an air pressure of 35–40 pounds per square inch, at a distance of 1½ to 2 feet between the gun and the work surface, and at a spray angle of about 45° to 55°. A film of about 0.001 to 0.003 inch, or 0.1 to 0.3 mils, may be built up by employing about 6 to 10 passes over the work. The surfaces are allowed to dry in the open air for about 15 to 30 minutes.

When the mold material can tolerate the temperature, heat-hardening or curing is produced by heating in an oven, preferably with forced circulation, at a temperature of about 250° C. for about 1 hour. Where the mold materials are susceptible to heat, from 0.045% to 0.15% by weight of the complete solution of Example 14, of diethanolamine is added to the composition. This curing catalyst is added at the time of application, so as not to decrease the shelf life of the composition. Representative curing schedules are as follows:

0.045% catalyst:
    1 hr. at 400° F.
    4 hrs. at 300° F.
    10 hrs. at 250° F.
    24 hrs. at 200° F.

0.15% catalyst:
    ½ hr. at 400° F.
    1 hr. at 300° F.
    2 hrs. at 250° F.
    6 hrs. at 200° F.

The foregoing application and hardening or curing conditions are likewise applicable to the various other surfaces to which the new composition may be applied to produce a hard, durable, tightly adherent, flexible and transparent continuous uniform silicone coat.

Example 17

Baking pans were coated with the composition of Example 14 in the manner of Example 16. Bread was baked repeatedly in the pans, with no use of grease, and excellent release was provided over many repetitions. It was simply necessary to knock the pans to release the bread, and then rinse under the tap. Sweet rolls were baked repeatedly in such pans, and the charred sugar material was released excellently.

Example 18

Bacon was fried on skillets provided with the coating composition of Example 14. After frying, it was merely necessary to rinse the skillet under the tap, without necessity for washing with soap or the like.

Example 19

Eggs were baked in butter in an aluminum egg poacher coated with the composition of Example 14. Excellent release from the utensil was obtained. Good release was also obtained of casserole dishes from Pyrex utensils, and of candies from metal pans.

Similarly, the new composition may be applied to a variety of cooking implements for preparing various foodstuffs, such as cakes, cookies, sweet muffins, pies, vegetables, eggs, meats, pancakes, waffles, coffee, casseroles, desserts, and others. The composition and method have found widespread application in the most diverse coating applications, for release and protective purposes, producing articles having excellent properties in use. The results in many cases are far superior to those previously obtained with silicone compositions.

The unusual effectiveness of the subject combination of a highly viscous polyorganosiloxane oil or a highly viscous polyorganosiloxane gum with a polyorganosiloxane resin as a release agent probably is the result of several factors. One likely explanation of the success of this material lies in the fact that part of the molecule of either the gum or the oil extends both below the surface of the cured film as well as above the surface. This condition is readily obtainable because of the springlike structure of the oil or gum. The larger the molecule of the gum or oil the better it is held at the surface of the coating. For this reason there is a reduced likelihood that the oil or gum will escape due to evaporation or frictional forces. The subject formulation makes it possible to obtain a high concentration of the gum or oil at the surface of the coating.

Obviously many modifications and variations of the invention as hereinbefore set forth may be made without departing from the spirit and scope thereof, and therefore only such limitations should be imposed as are indicated in the appended claims.

I claim:

1. A cooking implement having a coat of an intimate mixture consisting essentially of, in parts by weight, about 15 parts of an organosiloxane resin in which there are from 0.95 to 1.9 monovalent hydrocarbon radicals per silicon atom at least 50% of which are methyl radicals, and about 0.05 to 2 parts of a material selected from the group consisting of a polyorganosiloxane oil having a viscosity in excess of about 200,000 centistokes at 25° C. and a polyorganosiloxane gum having a viscosity in excess of about 400,000 centistokes at 25° C. said polyorganosiloxane resin containing from 0.95 to 1.9 monovalent hydrocarbon radicals per silicon atom, said polyorganosiloxane oil containing from about 1.8 to 2.1 hydrogen and hydrocarbon radicals per silicon atom, and said polyorganosiloxane gum containing about two monovalent hydrocarbon radicals per silicon atom.

2. A cooking implement having a coat of an intimate mixture of, in parts by weight, about 15 parts of a polyorganosiloxane resin in which there are from 0.95 to 1.9 monovalent hydrocarbon radicals per silicon atom at least 50% of which are methyl radicals, and about 0.05 to 2 parts of a polyorganosiloxane gum in which there are substantially two monovalent hydrocarbon radicals per silicon atom.

3. A cooking implement having a coat of an intimate mixture consisting essentially of, in parts by weight, about 15 parts of a polyorganosiloxane resin and about 0.05 to 2 parts of a nonthermosetting polyorganosiloxane oil having a viscosity in excess of about 200,000 centistokes at 25° C., said polyorganosiloxane resin containing from 0.95 to 1.9 monovalent hydrocarbon radicals per silicon atom at least 50% of which are methyl radicals and said polyorganosiloxane oil containing from about 1.8 to 2.1 hydrogen and hydrocarbon radicals per silicon atom.

4. A cooking implement as in claim 1 wherein the hydrocarbon radicals are selected from the group consisting of alkyl radicals having from 1 to 3 carbon atoms, the phenyl radical, and a tolyl radical.

5. A cooking implement as in claim 4 wherein the polyorganosiloxane resin contains from 1.3 to 1.7 monovalent hydrocarbon radicals per silicon atom, and wherein the polyorganosiloxane oil contains from 2 to 2.1 total hydrocarbon and hydrogen radicals per silicon atom.

6. A cooking implement as in claim 5 wherein from about 0.3 to 1 part of said oil is present per 15 parts of said resin.

7. A method of treating the surface of a cooking implement to obtain the release of foodstuffs which comprises applying to said surface in the form of a thin coat an intimate mixture consisting essentially of in parts by weight of about 15 parts of a thermosetting polyorganosiloxane resin and about 0.05 to 2 parts of a material selected from the group consisting of a polyorganosiloxane oil having a viscosity in excess of about 200,000 centistokes at 25° C. and a polyorganosiloxane gum having a viscosity in excess of about 400,000 centistokes at 25° C., said polyorganosiloxane resin containing from 0.95 to 1.9 monovalent hydrocarbon radicals per silicon atom at least 50% of which are methyl radicals, said polyorganosiloxane oil containing from about 1.8 to 2.1 hydrogen and hydrocarbon radicals per silicon atom, and said polyorganosiloxane gum containing about two monovalent hydrocarbon radicals per silicon atom, said resin and said material being dispersed in the volatile liquid organic solvent, and thereafter heat-hardening said coat.

8. A method of treating the surface of a cooking implement to obtain the release of foodstuffs which comprises applying to said surface in the form of a thin coat an intimate mixture consisting essentially of in parts by weight of about 15 parts of a thermosetting polyorganosiloxane resin and about 0.05 to 2 parts of a material selected from the group consisting of a polyorganosiloxane oil havng a viscosity in excess of about 200,000 centistokes at 25° C. and a polyorganosiloxane gum having a viscosity in excess of about 400,000 centistokes at 25° C., said polyorganosiloxane resin containing from 0.95 to 1.9 monovalent hydrocarbon radicals per silicon atom, said polyorganosiloxane oil containing from about 1.8 to 2.1 hydrogen and hydrocarbon radicals per silicon atom, and said polyorganosiloxane gum containing about two monovalent hydrocarbon radicals per silicon atom, at least 50% of the hydrocarbon radicals of said resin and said material selected from the group consisting of said polyorganosiloxane oil and said polyorganosiloxane gum being methyl radicals, and at least 80% of said hydrocarbon radicals being selected from the group consisting of methyl, ethyl and phenyl radicals, said resin and said material being dispersed in the volatile liquid organic solvent selected from the group consisting of toluene, xylene, benzene, and hydrocarbon solvents having a kauri-butanol rating greater than 50, and thereafter heat-hardening said coat.

References Cited by the Examiner

UNITED STATES PATENTS

| | | | |
|---|---|---|---|
| 2,442,196 | 5/48 | Coggeshall | 260—46.5 |
| 2,728,692 | 12/55 | Dennett | 260—29.1 |
| 2,793,197 | 5/57 | Brown | 260—33.6 |
| 2,833,441 | 5/58 | Hedlund | 260—29.1 |
| 2,833,735 | 5/58 | Nitzsche et al. | 260—29.1 |
| 2,977,336 | 3/61 | Blatz | 260—33.6 |
| 3,002,946 | 10/61 | Thomas | 260—33.6 |

MORRIS LIEBMAN, *Primary Examiner.*

LEON J. BERCOVITZ, *Examiner.*